Dec. 20, 1955    R. J. SCHOFIELD    2,727,997
OPTICAL WATER-PROBE APPARATUS
Filed April 8, 1953    4 Sheets-Sheet 1

INVENTOR
*Raymond J. Schofield*

BY *Stevens, Davis, Miller & Mosher*
ATTORNEYS

Dec. 20, 1955 R. J. SCHOFIELD 2,727,997
OPTICAL WATER-PROBE APPARATUS
Filed April 8, 1953 4 Sheets-Sheet 2

INVENTOR
Raymond J. Schofield
BY
Stevens, Davis, Miller and Mosher
ATTORNEYS

Dec. 20, 1955    R. J. SCHOFIELD    2,727,997
OPTICAL WATER-PROBE APPARATUS
Filed April 8, 1953    4 Sheets-Sheet 3
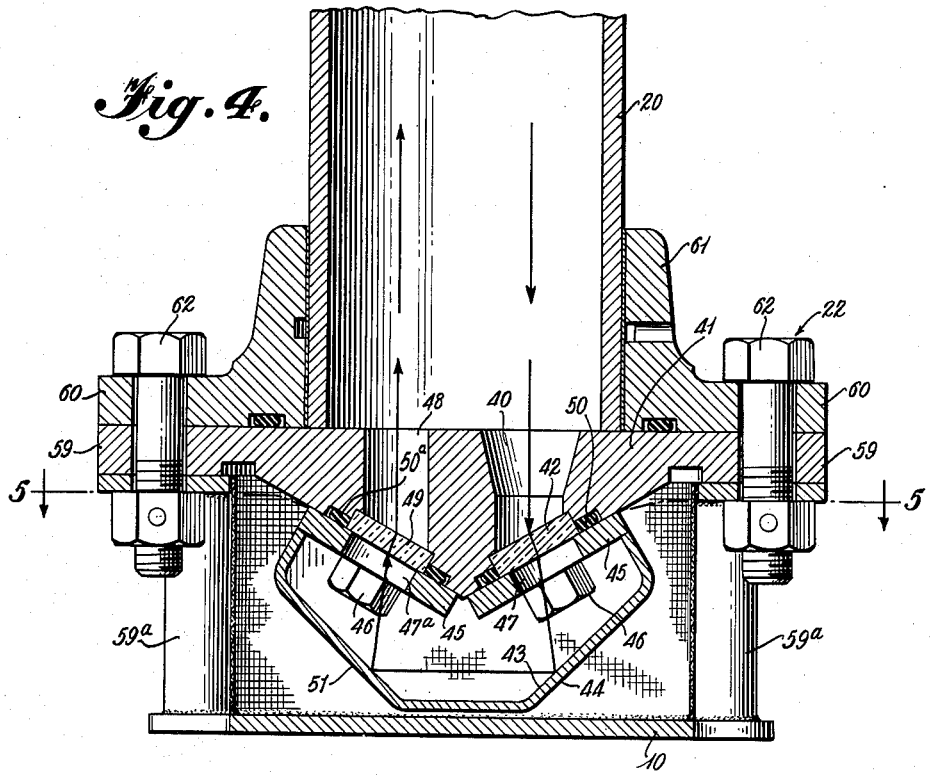
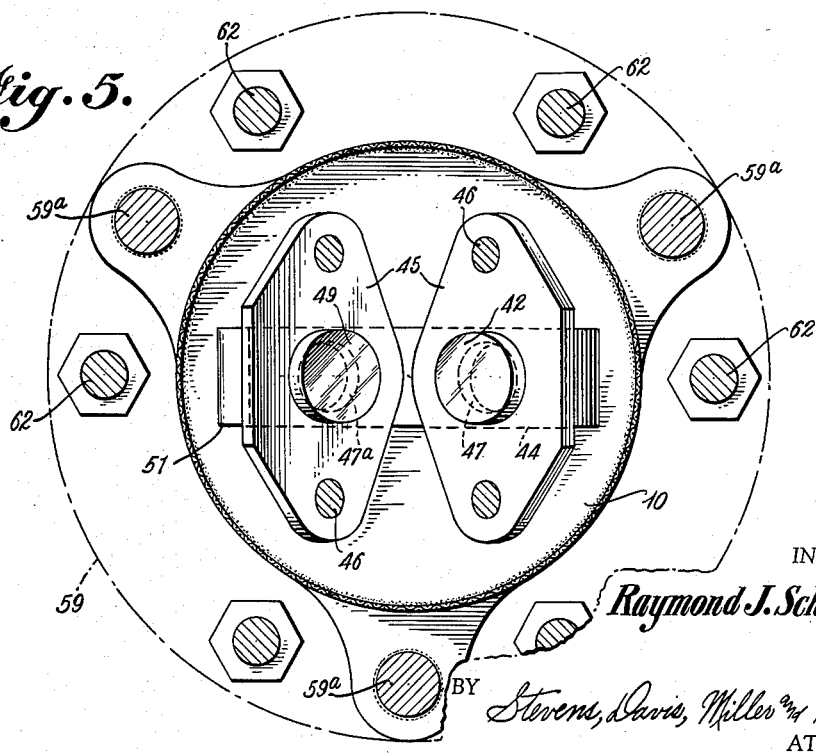
INVENTOR
Raymond J. Schofield
BY Stevens, Davis, Miller and Mosher
ATTORNEYS Dec. 20, 1955  R. J. SCHOFIELD  2,727,997
OPTICAL WATER-PROBE APPARATUS
Filed April 8, 1953  4 Sheets-Sheet 4

INVENTOR
Raymond J. Schofield
BY Stevens, Davis, Miller & Mosher
ATTORNEYS

United States Patent Office 2,727,997
Patented Dec. 20, 1955

2,727,997

OPTICAL WATER-PROBE APPARATUS

Raymond J. Schofield, Amityville, N. Y., assignor to Standard-Vacuum Oil Company, New York, N. Y., a corporation of Delaware Application April 8, 1953, Serial No. 347,447

3 Claims. (Cl. 250—218)

This invention relates to apparatus for automatically indicating the presence of a heavier liquid in a container otherwise filled with a lighter liquid immiscible with said heavier liquid and more particularly to an apparatus for automatically indicating the presence of water in the bottom of storage tanks otherwise filled with petroleum products, such as gasoline.

This invention will be described in this specification with particular reference to its applicability in gasoline storage systems but obviously it is much broader in scope since its principles can be applied to systems wherein the presence of one immiscible liquid with another in a particular container is to be indicated.

It is a known fact that gasoline is practically saturated with water when it leaves the refinery. This is due to many causes, none of which are particularly important for the purposes of this invention. If the gasoline is not saturated upon leaving the refinery it will soon become so upon storage if the atmosphere is at all humid. This dissolved or picked-up water precipitates in the storage tank, the precipitation usually being initiated by a drop in temperature. The precipitated water forms a layer at the bottom of the tank. It is important in most instances to prevent this water layer from becoming any substantial height. If it is allowed to accumulate unnoticed, it soon invades the outlet area of the tank from which it is withdrawn with the fuel. Water in gasoline is always obnoxious but it becomes particularly dangerous when the gasoline is used to fuel airplanes. Therefore, unless a check is kept on the level of the water in the fuel tanks used for supplying planes the percentage of water in the fuel reaches a very dangerous level.

It is therefore an object of this invention broadly to provide apparatus for automatically indicating the presence of a heavier liquid in a container when said heavier liquid rises above a certain predetermined critical or tolerable level therein, said container being otherwise filled with a lighter liquid immiscible with the heavier liquid.

It is a particular object of this invention to provide an automatic system of the type above described for use in gasoline storage tanks or containers.

It is a further object of this invention to provide an automatic "fail-safe" control system in conjunction with the indicating apparatus for ensuring against harmful operation by unskilled operators.

These and other objects will be apparent from the following description of the accompanying drawings.

Figure 4 is an enlargement of Figure 3;

Figure 5 is a view taken along the line 5—5 of Figure 4;

Figure 6 is a diagrammatic representation of a "fail-safe" control arrangement for the operation of the device constructed in accordance with the invention.

Figure 1:
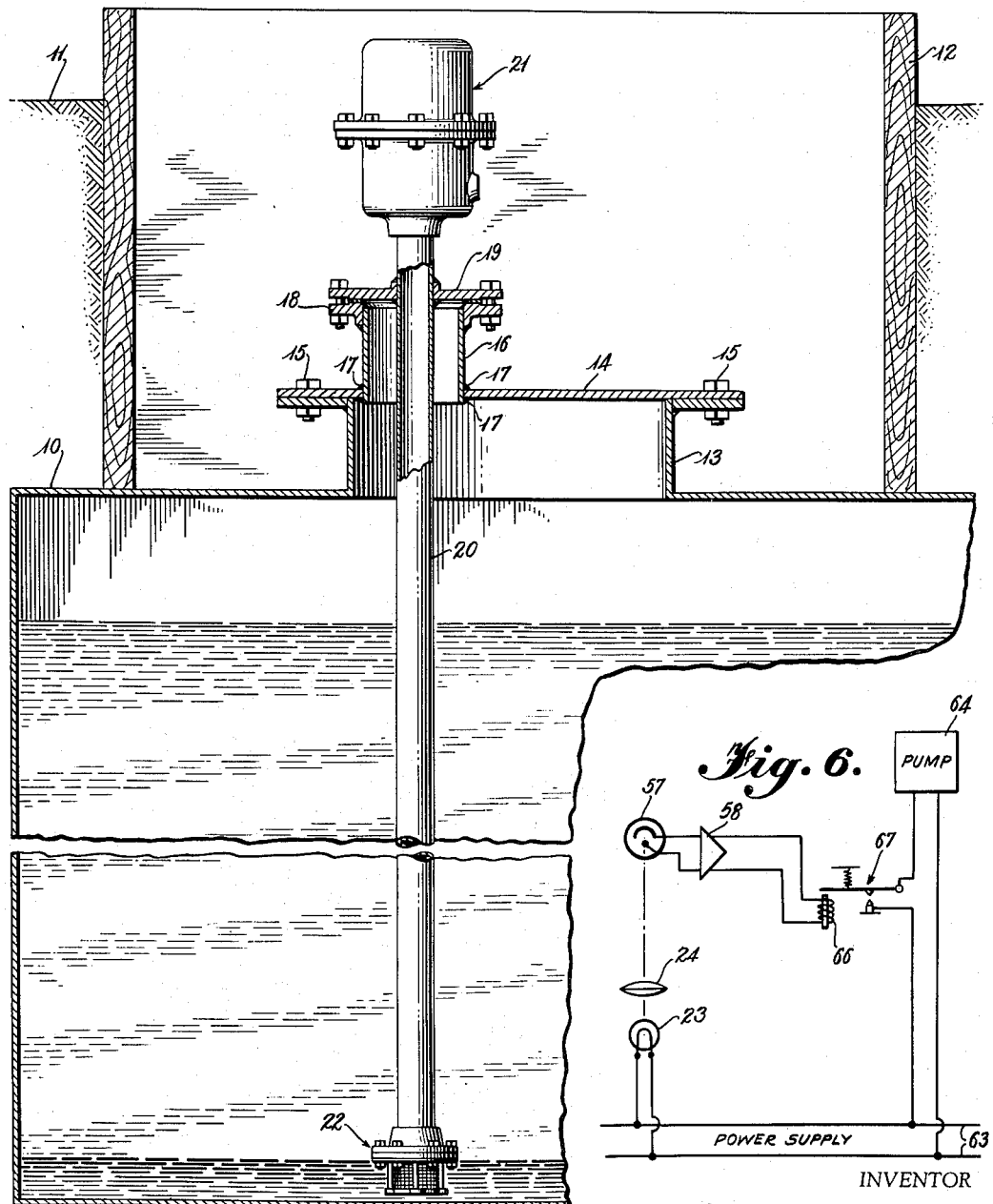
Figure 1 is a fragmentary side elevation partly in section of an underground storage tank incorporating the apparatus of this invention.
Figure 2:
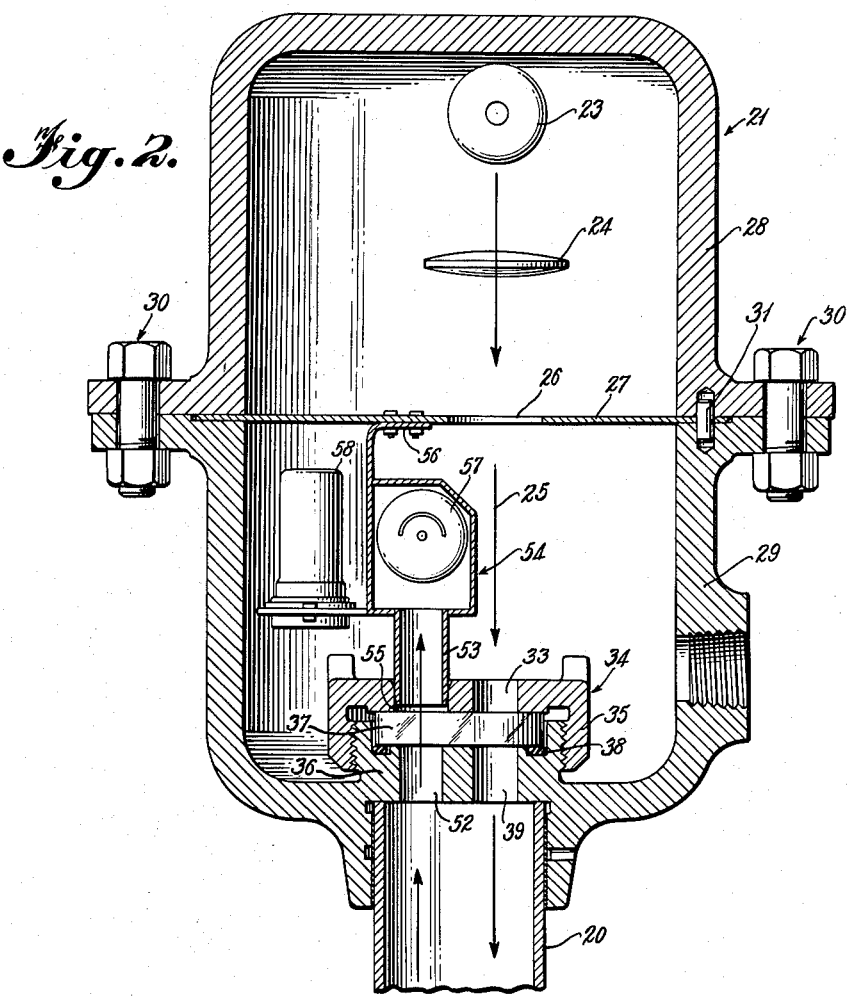
Figure 2 is a fragmentary vertical section of the apparatus constructed in accordance with this invention.
Figure 3:
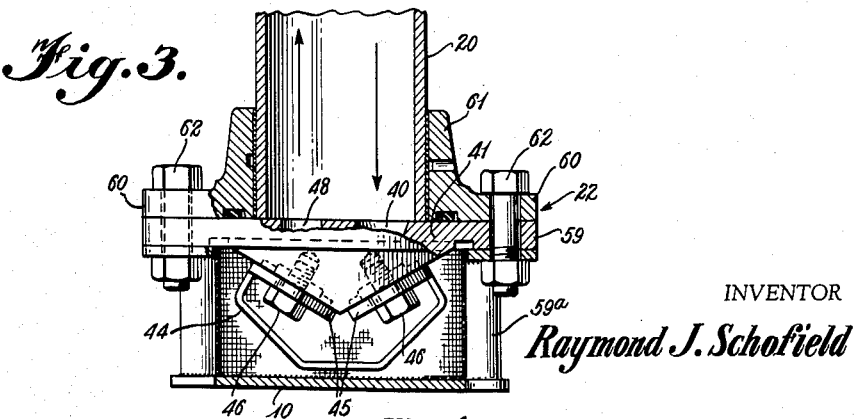
Figure 3 is a fragmentary vertical section of the apparatus constructed in accordance with this invention and is a continuation of the bottom part of Figure 2.

Figure 1 shows the over-all system. A storage tank or container 10 is located below the surface of the earth 11. A portion of the earth has been excavated and a retaining wall 12 inserted in the excavated portion. The top of the tank has provided therein a manhole 13 with a cover plate 14 held in place by bolt and nut assemblies 15. The cover plate 14 is also provided with a hole into which is inserted a short section of large diameter pipe 16, which pipe is welded at 17 to the plate 14. A forged slip-on flange 18 is welded to the top of the pipe 16. A second forged slip-on flange is bolted to flange 19 to provide a reduced diameter hole through which is inserted a pipe 20. The flange 19 is welded to this pipe 20. The pipe 20 leads upwardly into a housing 21 which contains part of the apparatus of this invention and also leads downwardly through the tank 10 into another housing 22 which is located adjacent the bottom of said tank and which contains another part of the apparatus of this invention. To explain in more detail the contents of housings 21 and 22, reference is now made to Figures 2 and 3.

Referring to Figures 2 to 5, a source of light 23, such as a light bulb, is mounted adjacent the top of housing 21 and directs light through a condenser lens 24 which lens concentrates the light into a narrow beam and directs the light beam in the direction of arrow 25. The beam passes through a port 26 in a supporting plate 27. This plate 27 is mounted between the two sections 28 and 29 of the housing 21, both of which sections are held in abutting relation by a plurality of bolt and nut assemblies 30. A dowel pin assembly 31 is also provided to properly align the plate 27.

After the beam has passed through port 26 it passes through port 33 in collar 34. This collar 34 has a threaded skirt 35 which threadedly engages the outer surface of an upwardly extending cylindrical portion 36, which portion is integral with the inside portion of the housing section 29. Between the top of this portion 36 and the bottom of the collar 34 is mounted a plane-plane glass 37. O-rings 38 are provided for correct mounting of this glass in its proper place. The collar 34 is threaded to the portion 36 until the glass 37 is tightly supported therebetween.

The beam, after emerging from the bottom part of the plane-plane glass 37, passes through the port 39 in the portion 36. It then continues on down through the pipe 20 and into the housing 22 adjacent the bottom of the tank 10. It will be noted that the beam in its downward direction is parallel to the walls of the pipe 20.

To explain the functioning of the elements in housing 22, let us consider that the tank is completely occupied by a single liquid. In the case of the gasoline system to which this description is specifically directed, let us consider that the gasoline alone occupies the tank and that there is no water layer at the bottom thereof. In that event the beam is directed through port 40 in the member 41. The beam strikes the plane-plane glass 42, the plane of which forms an acute angle with the downwardly directed beam incident thereon and due to the refraction of this glass the beam is deflected to the right, toward but not to the normal axis of said glass, as illustrated in this figure, said beam thereafter travelling towards a reflecting surface 43. This surface 43 is, in this particular embodiment, a polished opaque surface made of stainless steel. It may, however, of course be a mirror. The surface 43 is part of the reflecting stainless steel member 44. This member 44 has welded at the top thereof two inwardly directed metal plates 45. These plates are provided with drill holes for the insertion therein of bolts 46. These bolts 46 engage in threaded bolt holes in member 41. The plates 45 are also provided with ports 47 and 47a which ports are aligned with ports 40 and 48. By tightening bolts 46 the plane-plane glasses 42 and 49 are held in recesses provided in member 41. O-rings 50 and 50a are provided to give the glasses 42 and 49 a proper fit in these recesses.

The plane of the surface 43 forms an acute angle with the direction of the beam incident thereon and reflects that beam to the left as viewed in these figures, in other words towards another polished opaque surface 51. The plane of this surface 51 (Figure 4) also forms an acute angle with the path of the beam incident thereon. It reflects the beam through port 47a to plane-plane glass 49. The plane of this glass 49 forms an acute angle with the beam reflected from surface 51. Due to the refraction of this glass the beam is deflected, through port 48 and passes upwardly through pipe 20 in a path parallel to the downward path of the beam. It must be noted that the refraction of both glasses 42 and 49 is such as to bend the beam toward but not to the normal axis of the glasses. Of course, by the normal axis is meant the axis defined by a line passing through the center of said glasses at right angles thereto. The plane surfaces of the metal reflector system are so orientated that in the absence of a liquid-liquid interface from the optical path, the direction of the light beam is changed by 180°.

The beam in its upward path passes through port 52 in portion 36, the plane-plane glass 37, and into a tubular extension 53 of photocell housing 54. The extension 53 fits in a port 55 of the collar 34. The housing 54 is mounted to the supporting plate 27 by the bracket 56. The cell 57 within the photocell housing 54 is a light-sensitive means such as a photocell and conveys its response to an indicating means which is illustrated in part by the amplifier tube 58. Various indicating devices, of course, can be operatively connected to this amplifier.

Returning to housing 22 for a moment, the member 41 has a flange 59 which is bolted to the flange 60 of the skirt member 61 by bolt and nut assemblies 62. This skirt member is preferably silver soldered to the lower portion of the pipe 20.

To review the operation of the apparatus under the conditions previously set forth, the light source 23 directs its light to a condenser lens 24 which forms the light into a narrow beam. The beam passes downwardly through ports 26 and 33, through plane-plane glass 37 whose axis is parallel to the path of the beam, through port 39, tube 20 and port 40 to plane-plane glass 42. This glass 42 deflects the beam to the right as viewed in these figures to a reflecting surface 43 of the member 44. The beam is reflected from the surface 43 to the left as viewed in these figures to surface 51. Surface 51 reflects the beam upwardly and slightly to the right to port 47a and on to plane-plane glass 49. This glass 49 deflects the beam upwardly through port 48 so that in its upward path the beam travels parallel to its downward path in pipe 20. It then passes through port 52, plane-plane glass 37, port 55, extension 53 and into the photocell 57. This actuates the cell and the indicating means 58.

Now, in the particular system to which this specification is specifically directed, in other words the gasoline storage system, when water forms a layer in the bottom of the tank and this layer reaches a level slightly above the point on surface 43 which the beam normally strikes, a different path of the beam is established. Of course it must be understood that the housing 22 is supported by post 59a from the bottom of the tank 10 and the member 44 is actually a relatively narrow strip of material so that the liquid in the tank at all times has free access to the interior of this housing. In this event, when the level of the water reaches that previously described an interface between the water and the gasoline is interposed in the normal path of the beam and particularly between plane-plane glass 42 and surface 43, and between plane-plane glass 49 and surface 51. This interface further deflects the beam so that the total change of direction of the beam from downward to upward path is no longer 180°. In this event the beam, when striking surface 51, is reflected away from port 47a and does not pass through pipe 20. Since the beam which has been deflected by the interface no longer enters port 52 and finally extension 53 and the photocell 57, the indicating means fails to function, or begins to function, whatever arrangement is desired, the important thing being that the status of the indicating means is thereby changed upon the arrival of the interface above the predetermined tolerable level. This same result occurs in any mixture of two liquids which are immiscible, one heavier than the other, which forms an interface. In this particular embodiment the plane-plane glasses 42 and 49 are positioned above the predetermined level. The beam enters the interface at an incidence angle removed from 0° and in particular some angle greater than 0° and less than 90°.

Figure 7:
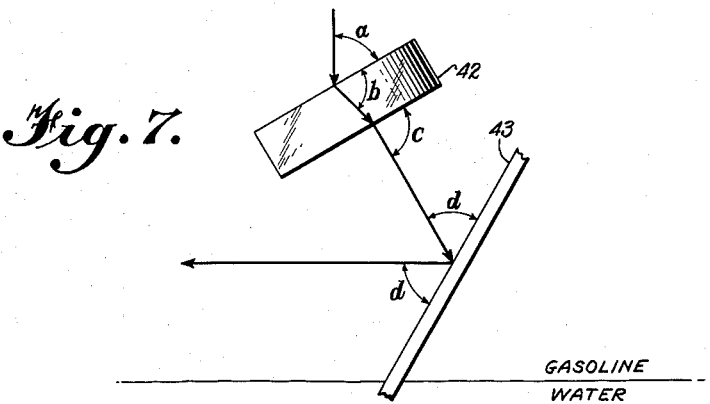
Figures 7–9 are diagrammatic illustrations of the path of the light beam under various operational conditions.
Figure 8:
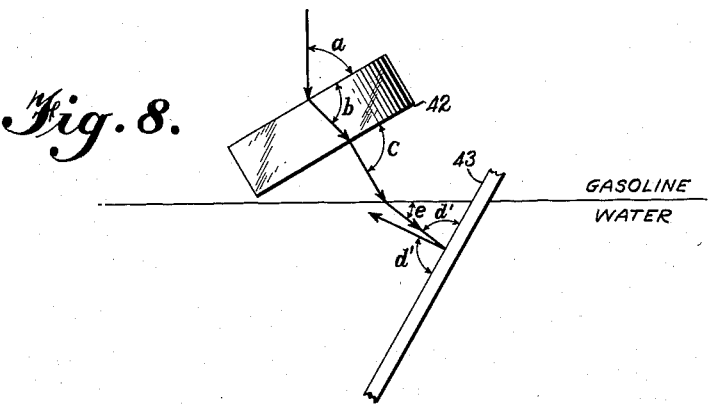
Figure 9:
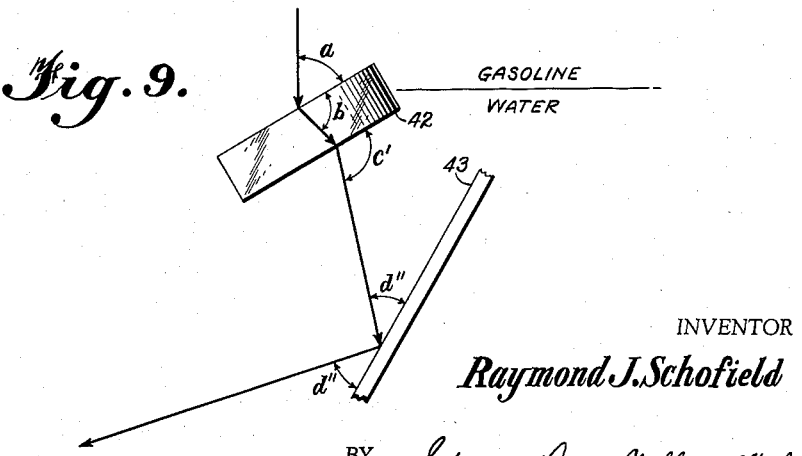

The above may be better understood with reference to Figures 7 to 9. In Figure 7 there is shown the condition when the tank is completely full of gasoline or with so little water present with the gasoline that the interface is at a level below the predetermined level, that is, the level at which the beam normally strikes surface 43. When, however, the water level rises above the predetermined tolerable level to a level as indicated in Figure 8, the interface has a definite effect on the path of the beam. The angles indicated at a, b and c are the same as in Figure 7, but the beam is further deflected by the interface an amount indicated by angle e. It thereafter strikes surface 43 at an angle d' which is greater than the angle d of Figure 7. Therefore the reflection angle is also equal to d'. The beam, after leaving surface 43, strikes surface 51 at a different incidence angle and consequently the beam is lost in its upward journey toward the light-sensitive means.

In Figure 9 is shown the case wherein the interface is above the glass 42. In this case the beam as it emerges from glass 42 is deflected an angle c' which is greater than angle c of Figures 7 and 8. This is because the index of refraction of the water is less than that of gasoline. The angle at which the beam of light strikes surface 43 is now d'' which is less than d. Therefore the beam is lost under these conditions in its upward journey toward the light-sensitive means.

Referring to Figure 6, there is disclosed what might be called a "fail-safe" control arrangement. Its purpose is to insure that the pump will not operate unless the indicating apparatus is also operating. Of course the indicating apparatus will not operate unless it is capable of operation (in other words that the light source has not burned out or the photocell has not gone bad) and will not operate unless the water in the tank is below the predetermined level. This is assured by the arrangement of Figure 6 wherein the power supply lines 63 feed electrical current to the pump 64 and the light source 23. This source gives off rays of light energy concentrated by lens 24 into a beam which, under conditions explained above, will energize photocell 57. The energy produced by the photocell is amplified by amplifier 58 in the indicating means. The output of the amplifier energizes solenoid 66 which closes the spring-biased switch 67. This closes the energizing circuit to the pump 64. If photocell 57 does not receive any light energy because of power failure, liquid rising above the predetermined level in the tank, or light source or photocell failure, the pump 64 does not operate.

What has been described is a particular embodiment of this invention. Other embodiments obvious to those skilled in the art from the teachings herein are contemplated to be within the spirit and scope of the following claims.

What is claimed is:

1. In combination with a vessel containing a liquid, apparatus for indicating the absence of another immiscible liquid of different refractive index comprising: stationary reflector means; a conduit extending vertically from a point above said reflector beneath the surface of said liquid, said conduit being sealed at its lower end with first and second light refraction elements laterally displaced with respect to each other, the surfaces of which form an acute angle with the axis of said conduit; a light source and light sensitive means laterally displaced with respect to each other and positioned at the upper end of said conduit; collimating means to direct a beam of light from said source parallel to the axis of the conduit through the first refractor and liquid to said reflector means whereby the beam is reflected through the second refractor and travels parallel to the conduit axis to the light sensitive means.

2. Apparatus according to claim 1 wherein the vessel is an oil pipe line.

3. Apparatus according to claim 1 wherein the light refracting elements are plane-plane glasses.

References Cited in the file of this patent
UNITED STATES PATENTS

| | | |
|---|---|---|
| 1,883,971 | Kryzanowsky | Oct. 25, 1932 |
| 2,324,304 | Katzman | July 13, 1943 |
| 2,427,996 | Seaman | Sept. 23, 1947 |
| 2,573,006 | Good | Oct. 30, 1951 |
| 2,606,297 | Sweet | Aug. 5, 1952 |